Sept. 25, 1951     A. M. DUNLAP     2,568,796
MOTORCYCLE SEAT SUPPORT
Filed Aug. 9, 1949
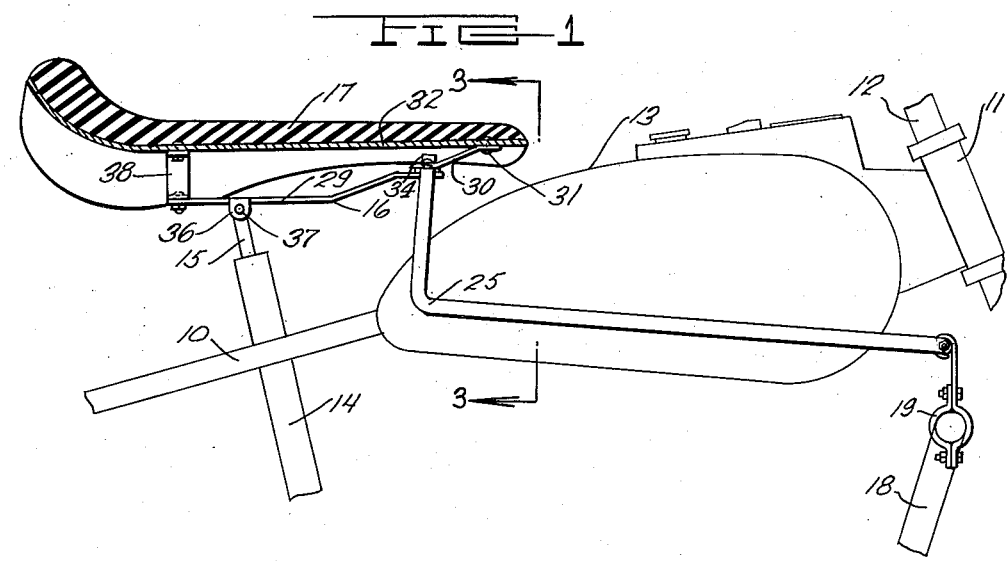
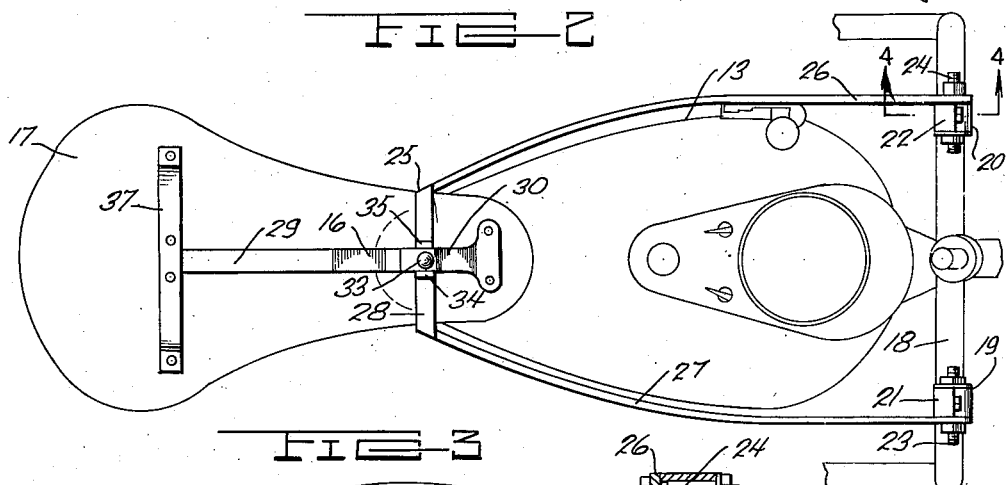
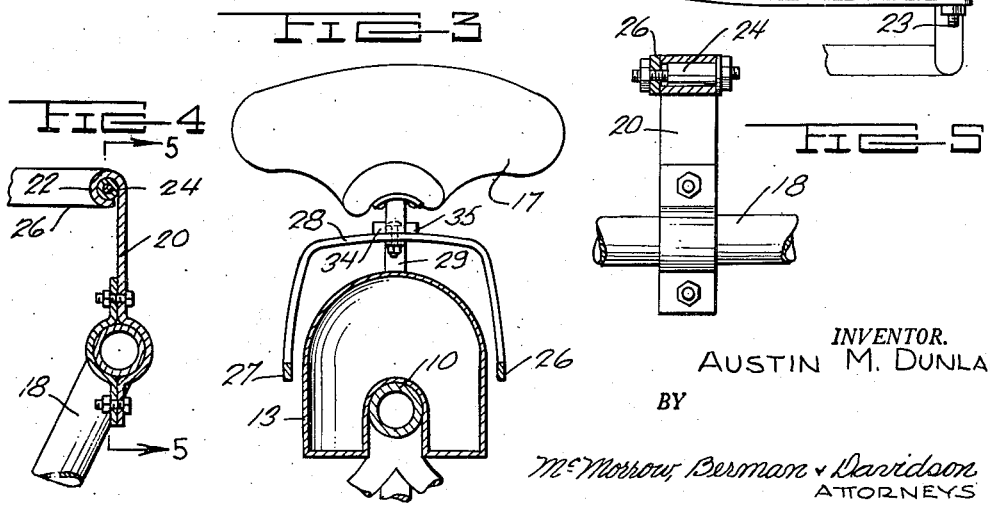
*INVENTOR.*
AUSTIN M. DUNLAP
BY
*McMorrow, Berman & Davidson*
ATTORNEYS Patented Sept. 25, 1951

2,568,796

UNITED STATES PATENT OFFICE 2,568,796

MOTORCYCLE SEAT SUPPORT

Austin M. Dunlap, Olanta, Pa.

Application August 9, 1949, Serial No. 109,267

3 Claims. (Cl. 155—5.2)

This invention relates to motorcycle seat supports, and more particularly to a support having a long lever arm for controlling movements of the seat relative to the motorcycle frame.

It is among the objects of the invention to provide an improved motorcycle seat support, particularly for a double or "buddy" type of seat, which has a pivot point near the front end of the motorcycle and substantially limits movements of the seat relative to the motorcycle frame to a swinging movement on a long radius, so that the front and rear ends of the seat are substantially equally cushioned, sharp tilting movements of the seat are eliminated, and the seat springing acts in substantially the same manner, whether the seat is carrying one or two persons, thus making it possible for a motorcycle with a double-type seat to carry two persons in comfort, which support can be easily applied to an existing motorcycle without material modification of the motorcycle or seat structure, or can be incorporated in motorcycles during the manufacture thereof, if desired, and which is simple and durable in construction, economical to manufacture and install, does not interfere in any way with the normal operation of the motorcycle, and is neat and attractive in appearance.

Other objects and advantages will become apparent from a consideration of the following description and the appended claims in conjunction with the accompanying drawing, wherein:

Figure 1 is a side elevation of a fragmentary portion of a motorcycle showing a seat and a seat support illustrative of the invention operatively applied thereto the seat being broken away and shown in cross section to better illustrate the construction of the seat support;

Figure 2 is a top plan view of the seat support and fragmentary motorcycle portion illustrated in Figure 1;

Figure 3 is a transverse cross-section on the line 3—3 of Figure 1;

Figure 4 is a cross-section on the line 4—4 of Figure 2; and

Figure 5 is a cross-section on the line 5—5 of Figure 4.

With continued reference to the drawing, the seat support of the invention may be applied to various types of existing motorcycles, and the motorcycle structure has, therefore, been illustrated only fragmentarily and diagrammatically. The motorcycle has a frame including a top bar 10, the front end of which is secured to the fork-bearing sleeve 11 in which the fork structure 12 is journaled. The front fork 12 carries at its lower end a front wheel, not illustrated, and the handlebars, not illustrated, are connected to the upper end of this front fork structure. Immediately to the rear of the front fork-bearing sleeve 11, the gas tank 13 straddles the top bar 10 and the seat post 14 extends upwardly adjacent the rear end of the gasoline tank. The seat post 14 comprises a tubular frame member, and a stem 15 extends upwardly from the upper end of the post 14 and is pivotally attached at its upper end to a supporting structure 16 upon which the seat 17 is mounted. Double-acting springs, not illustrated, are connected between the post and the stem. An example of such a double-acting, spring suspension is fully shown and described in Patent No. 1,050,925, granted January 21, 1913, to Abram W. Duck, for Saddle Mount.

A crash or guard bar 18 is provided near the front end of the motorcycle and projects outwardly from the opposite sides of the motorcycle frame and is curved somewhat rearwardly to protect the legs of a person riding the motorcycle. The upper portions of this crash bar or guard bar are located near the bottom end of the front fork-bearing sleeve 11 and at respectively-opposite sides of the motorcycle frame.

In carrying out the present invention, two split-ring brackets 19 and 20 are secured on the crash bar 18 at respectively-opposite sides of the motorcycle frame and project upwardly from the upper portion of the crash or guard bar. At their upper ends these brackets are rolled to provide respective bearing sleeves 21 and 22 which respectively receive spindles 23 and 24, each of which has a substantially cyclindrical intermediate portion and reduced, externally screw-threaded portions extending outwardly from the opposite ends of the intermediate portion substantially concentric therewith.

A U-shaped lever 25 has its legs 26 and 27 provided near their ends at the open end of the lever with apertures which receive reduced end portions of the spindles 23 and 24, respectively, so that these spindles pivotally connect the front end of the lever to the guard bar 18 through the intermediacy of the brackets 19 and 20.

The legs 26 and 27 of the lever 25 are curved to pass around the sides of the gas tank 13, and at their rear ends, opposite the ends pivotally connected to the guard bar 18, these legs are interconnected by a bight 28 which is arched upwardly to pass over the rear portion of the gas tank.

Suitable nuts are threaded on the screw-threaded extensions of the spindles 23 and 24 to maintain these spindles against lengthwise movement in the sleeves provided at the upper ends of the brackets 19 and 20. The nuts at the outer ends of the spindles bear against the outer sides of the legs 26 and 27 of the U-shaped lever 25, while suitable bearing washers are interposed between the nuts at the inner ends of the spindles and the adjacent ends of the sleeves 21 and 22.

The structure 16 includes an elongated strap member 29, the front end of which is disposed below the mid-length portion of the bight 28 of the U-shaped lever 25, and a T-shaped member 30, the stem of which is disposed above the mid-length portion of the bight 28, and the cross of which is secured to the seat 10 near the front end of the latter by suitable means such as rivets 31 extending through apertures provided in the cross of the member 30 near the respectively-opposite ends of such cross and also extending through the base 32 of the seat or saddle 17. The bight 28, the strap 29 and T-shaped member 30 are provided with registering apertures and a bolt or rivet 33 extends through these apertures to rigidly secure the members 29 and 30 to the bight 28 of the lever 25. Projections 34 and 35 are provided on the bight 28 at the respectively-opposite sides of the member 30 to restrain the member 30 against turning movements relative to the lever 25 about the bolt 33, so that the front end of the seat cannot swing laterally. Intermediate its length the strap 29 is provided with a pair of spaced-apart, downwardly-projecting apertured ears 36 which straddle the upper end of the stem 15 and the member 29 is pivotally connected to the stem by a pivot pin 37 extending through the ears 36 and through the upper end of the stem 15.

With this arrangement, when the seat 17 moves relative to the frame of the motorcycle, it will be constrained to a movement about the common axis of the two spindles 23 and 24, such movement being resiliently resisted by the seat post or strut 14. Both ends of the seat will thus be substantially equally cushioned and will have substantially the same movement, as the axis of the spindles 23 and 24 is located a substantial distance from the front end of the seat. Springing of the seat thus acts in substantially the same manner regardless of whether the seat is carrying one or two persons or whether one person is seated near the front end or near the rear end of the seat.

The lever 25 is formed of a suitable resilient material, such as spring steel, to accommodate minor movements or vibrations of either the seat or the guard bar and to supplement, to some extent, the action of the springs in the seat post 14.

At its rear end the strap 29 is secured to the seat base 32 by a U-shaped cross-bar 38.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A motorcycle seat support comprising a U-shaped lever having a pair of legs outwardly curved to pass around a motorcycle gas tank and having at one end a bight arched to extend over the rear portion of the gas tank, brackets pivotally connected to said lever legs respectively at the open end of said lever for attaching said lever to a motorcycle frame near the front end of the latter, a strap attached to said lever bight and extending therefrom in a direction opposite said legs for attachment to a motorcycle seat post and seat, and a member attached to said lever bight and extending therefrom in the same direction as said legs for attachment at its front end to a motorcycle seat near the front end of the latter.

2. A motorcycle seat support comprising a U-shaped lever having a pair of legs outwardly curved to pass around a motorcycle gas tank and having at one end a bight arched to extend over the rear portion of the gas tank, brackets pivotally connected to said lever legs respectively at the open end of said lever for attaching said lever to a motorcycle frame near the front end of the latter, a strap attached to said lever bight and extending therefrom in a direction opposite said legs for attachment to a motorcycle seat post and seat, and a member attached to said lever bight and extending therefrom in the same direction as said legs for attachment at its front end to a motorcycle seat near the front end of the latter, said lever being formed of resilient material.

3. A seat support for a motorcycle having a frame and a seat supporting stem at one end of the frame comprising an elongated lever adapted to extend longitudinally of the motorcycle frame, means connected to one end of said lever for pivotally connecting said one end of the lever to the frame near the other end of the latter, an elongated strap member secured at one end to said lever at the other end of the latter and extending from said other end of the lever in a direction away from said one end of the lever, means on said strap member intermediate the length thereof for connecting said strap member to the seat supporting stem, a U-shaped seat engaging member secured at its mid-length location to the other end of said strap member and disposed substantially perpendicular to the latter, and a T-shaped seat engaging member secured at the distal end of its stem portion to said other end of the lever and extending toward said one end of the latter.

AUSTIN M. DUNLAP.

REFERENCES CITED

The following references are of record in the file of this patent:

UNITED STATES PATENTS

| Number | Name | Date |
|---|---|---|
| 1,006,658 | Hoffer | Oct. 24, 1911 |
| 1,050,925 | Duck | Jan. 21, 1913 |

FOREIGN PATENTS

| Number | Country | Date |
|---|---|---|
| 34,326 | Switzerland | June 21, 1905 |